United States Patent [19]
Burridge

[11] Patent Number: 5,982,371
[45] Date of Patent: Nov. 9, 1999

[54] METHOD AND APPARATUS FOR EXECUTING AND DISPLAYING OUTPUT OF AN ENVIRONMENT IN A HOST ENVIRONMENT

[75] Inventor: Rich Burridge, Mountain View, Calif.

[73] Assignee: Sun Microsystems, Inc., Palo Alto, Calif.

[21] Appl. No.: 08/593,712

[22] Filed: Jan. 29, 1996

[51] Int. Cl.$^6$ ........................................... G06F 3/00
[52] U.S. Cl. .................................................. 345/418
[58] Field of Search .................... 395/326, 329, 395/332, 333, 334, 335

[56] References Cited

U.S. PATENT DOCUMENTS

| | | |
|---|---|---|
| 5,345,550 | 9/1994 | Bloomfield . |
| 5,347,627 | 9/1994 | Hoffmann et al. . |
| 5,414,806 | 5/1995 | Richards . |
| 5,421,012 | 5/1995 | Khoyi et al. ............................. 395/650 |
| 5,423,034 | 6/1995 | Cohen-Levy et al. . |
| 5,436,637 | 7/1995 | Gayraud et al. . |
| 5,461,710 | 10/1995 | Bloomfield et al. . |
| 5,491,784 | 2/1996 | Douglas et al. . |
| 5,493,638 | 2/1996 | Hooper et al. . |
| 5,544,288 | 8/1996 | Morgan et al. . |
| 5,548,702 | 8/1996 | Li et al. . |
| 5,550,968 | 8/1996 | Miller et al. . |
| 5,559,942 | 9/1996 | Gough et al. . |
| 5,566,330 | 10/1996 | Sheffield . |
| 5,570,462 | 10/1996 | McFarland . |
| 5,694,603 | 12/1997 | Reiffin . |
| 5,694,604 | 12/1997 | Feiffin . |

OTHER PUBLICATIONS

SYBEX Inc. "Mastering Windows 3.1", 1993, pp. 64–66, 50–56, 642–644.

Ronald L. Johnston, "The Dynamic Incremental Compiler of APL/3000," APL79 Conference Proceedings, Association for Computing Machinery, Rochester, New York, U.S.A. May 30–Jun. 1, 1979, pp. 82–87.

Leo J. Guibas and Douglas K. Wyatt, " Compilation and Delayed Evaluation in APL," Fifth Annual Symposium on Principles in Programming Languages, Tuscon, Arizona Jan. 23–25, 1978, pp. 3–6.

Glenn Krasner, "The Smalltalk–80 Virtual Machine," BYTE Publications, Inc. Aug. 1991, pp. 300–320.

*Primary Examiner*—Phu K. Nguyen
*Assistant Examiner*—Cliff N. Vo
*Attorney, Agent, or Firm*—Hecker & Harriman

[57] ABSTRACT

An environment is emulated in a host environment. Output generated in the emulated environment is displayed in a window of the host environment. The emulated environment's output is in the form of Postscript commands that map to the entire screen. The host environment emulates the Postscript commands an maps the output to a window. Input associated with the window is retrieved by an event driver running in the host environment. Each instance of input is referred to as an event. Each event is translated into an event of the emulated environment by an event driver. A translated event is stored in shared memory for access by a window server. The event driver notifies the window server that one or more events are queued in shared memory. The window server processes the queued events by, for example, transmitting the event to an application running in the emulated environment.

41 Claims, 18 Drawing Sheets

METHOD AND APPARATUS FOR EXECUTING AND DISPLAYING OUTPUT OF AN ENVIRONMENT IN A HOST ENVIRONMENT

BACKGROUND OF THE INVENTION

1. Field of the Invention

This invention relates to the execution of an environment in a window of another environment or operating system.

2. Background

OpenStep™ is an open, high-volume portable standard for object-oriented computing. It provides a standard application programming interface (API). The OpenStep specification is based on NeXTStep. NeXTStep™ is an object-oriented operating system of NeXT Computer, Inc.

The NeXTStep Window Server running in the NeXT environment is a low-level process that is responsible for drawing images to the screen and sending events to applications. The NeXTStep Window Server manages the screen, keyboard, and mouse.

The NeXTStep Window Server includes a Display Postscript interpreter that performs the actual drawing of lines, text, and images. Postscript is a device-independent graphics description language that processes commands to perform line drawing, typesetting, and image presentation on the screen and printer output.

In addition to providing graphic user interface (GUI) capabilities, NeXTStep provides an application development environment. In addition to the development environment, the NeXTStep Application Kit, or App Kit, provides object classes for providing functionality to an application.

The NeXTStep environment runs on the Mach operating system (OS). The Mach OS is a microkernel-based operating system. A microkernel-based OS provides a basic level of services with the bulk of the operating system services supplied by user-level services. For example, the Mach kernel provides process management, memory management, communication and Input/Output services. Services such as files and directories are handled by user-level processes.

The communication service provided by the Mach OS uses a data structure called a port A port is analogous to a mailbox. A sender (e.g., a thread, or executable subcomponent of a process) communicates with a receiver (e.g., thread of another process) by writing a message to the mailbox, or port. The receiver retrieves the sender's message from the port.

In the above example, the sender's message is not actually stored in the port. The message is stored in a message queue. The port contains a count of the number of messages in the message queue. When a port is created, an integer that identifies the port is sent back to the creator (e.g., a thread). The identifier is used to access the port to send or receive a message.

NeXT Computer, Inc. provides a technology referred to as Portable Distributed Objects (PDO). PDO provides the ability to use distributed object classes to write programs on non-NeXT platforms (e.g., HP, SunOS, and Solaris). PDO also provides Mach port emulation facilities.

Solaris™ is a UNIX operating environment that can run on multiple hardware platforms such as Intel x86, SPARC, and PowerPC processors. OpenWindows™ is a windowing system based on the X11 windowing specification that runs in Solaris. The X11/DPS is a windowing system that runs in OpenWindows. Solaris, OpenWindows, and X11/DPS are products that are available from Sun Microsystems, Inc. (Sun Microsystems, Inc., OpenWindows, X11/DPS, and Solaris are trademarks or registered trademarks of Sun Microsystems, Inc. in the U.S. and certain other countries.)

The NeXTStep environment generates output using the entire screen. It would be beneficial to be able to run the NeXTStep/OpenStep environments in another environment such as Solaris such that the NeXTStep/OpenStep environment runs within a window of the environment. Prior emulation schemes provide emulation by emulating system-level instruction sets. It would be beneficial to provide emulation capabilities at the Postscript level.

SUMMARY OF THE INVENTION

An environment is emulated in a host environment. Output generated in the emulated environment is displayed in a window of the host environment. The emulated environment's output is in the form of Postscript commands that map to the entire screen. The host environment emulates the Postscript commands and maps the output to a window. Input associated with the window is retrieved by an event driver running in the host environment. Each instance of input is referred to as an event. Each event is translated into an event of the emulated environment by an event driver. A translated event is stored in shared memory for access by a window server. The event driver notifies the window server that one or more events are queued in shared memory. The window server processes the queued events by, for example, transmitting the event to an application running in the emulated environment.

When the emulated environment is invoked, its window server is invoked. The window server is modified to access the host environment and its display system. The window server invokes the event driver. The window server and event driver attach themselves to shared memory and the emulated environment's window. Output to the window is preferably displayed in 24-bit color. However, gray scale output can be used if an 8-bit screen depth is present.

An event is translated by the event driver. The event driver can store a single translated event in shared memory and notify the window server. Alternatively, the event driver can process multiple events before noting the window server. In addition, the event driver can combine events where possible. If an event is combined with a previous event, it is not written to shared memory.

As described above, the output of an emulated environment running in a host environment is processed by a window server running in the host environment. The window server processes the output such that the output is displayed in a window of a display of the host environment. Alternatively, the window server can be running on a system that executes the emulated environment as its native environment. The native environment includes a window server. Output generated by an application running in the emulated environment is transmitted to the native environment's window server using a communication mechanism such as a port. The window server processes and displays the output in the native environment. Input associated with a window in the native environment is processed by the native environment's window server and transmitted (via a port) to an application running in the emulated environment running in the host environment.

DETAILED DESCRIPTION OF THE INVENTION

A method and apparatus for executing an environment within a window of another environment is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
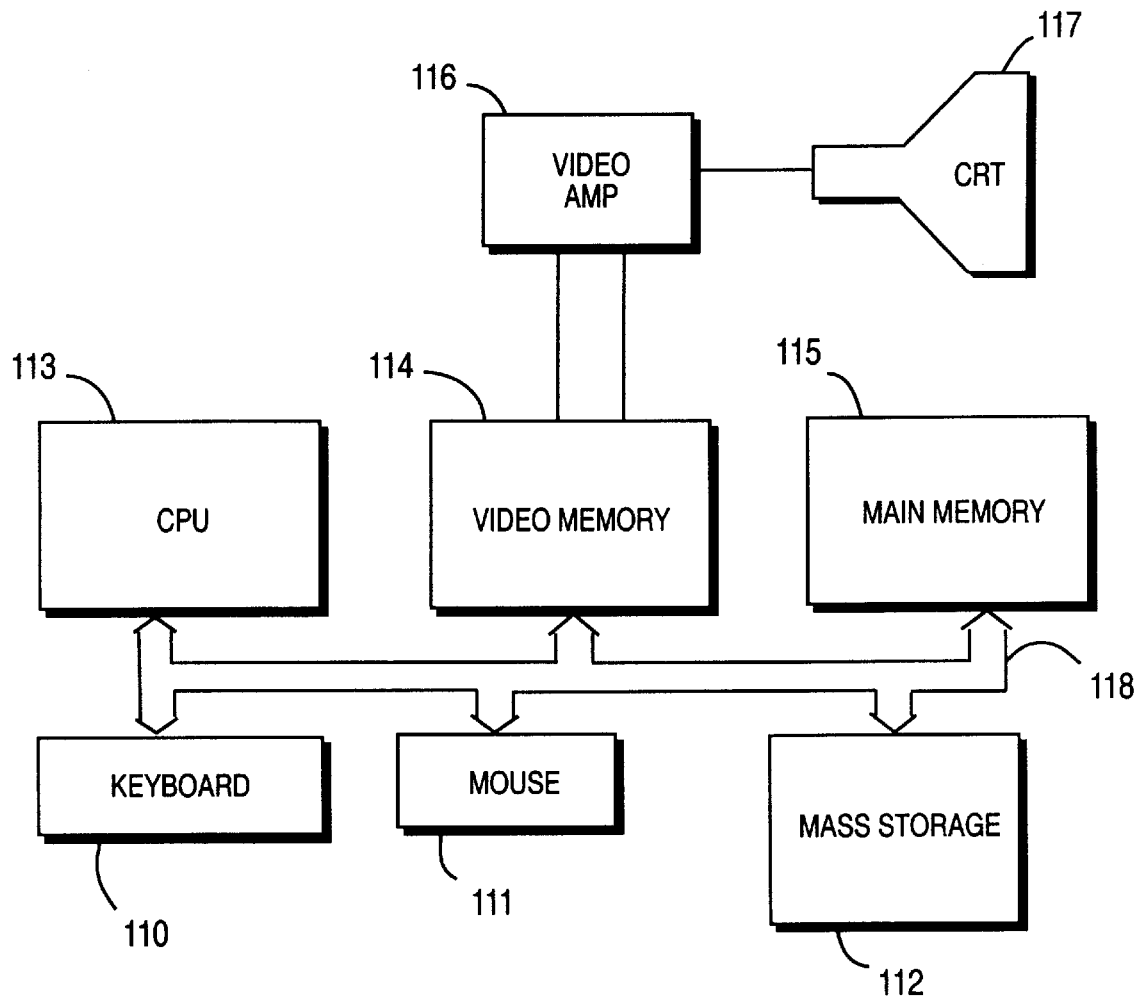
FIG. 1 provides an example of a general purpose computer to be used in accordance with embodiments of the present invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bidirectional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the 680X0 processor, a 80x86 microprocessor manufactured by Intel, or a SPARC microprocessor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment. When a general purpose computer system such as the one described executes the processes and process flows described herein, it is configured to run an environment within a window of another environment.

By way of example, emulation of the NeXTStep/OpenStep environment using X11/DPS under OpenWindows on Solaris is described herein. However, it should be apparent that the functionality described herein can be used to emulate any environment within another environment.

Figure 2A:
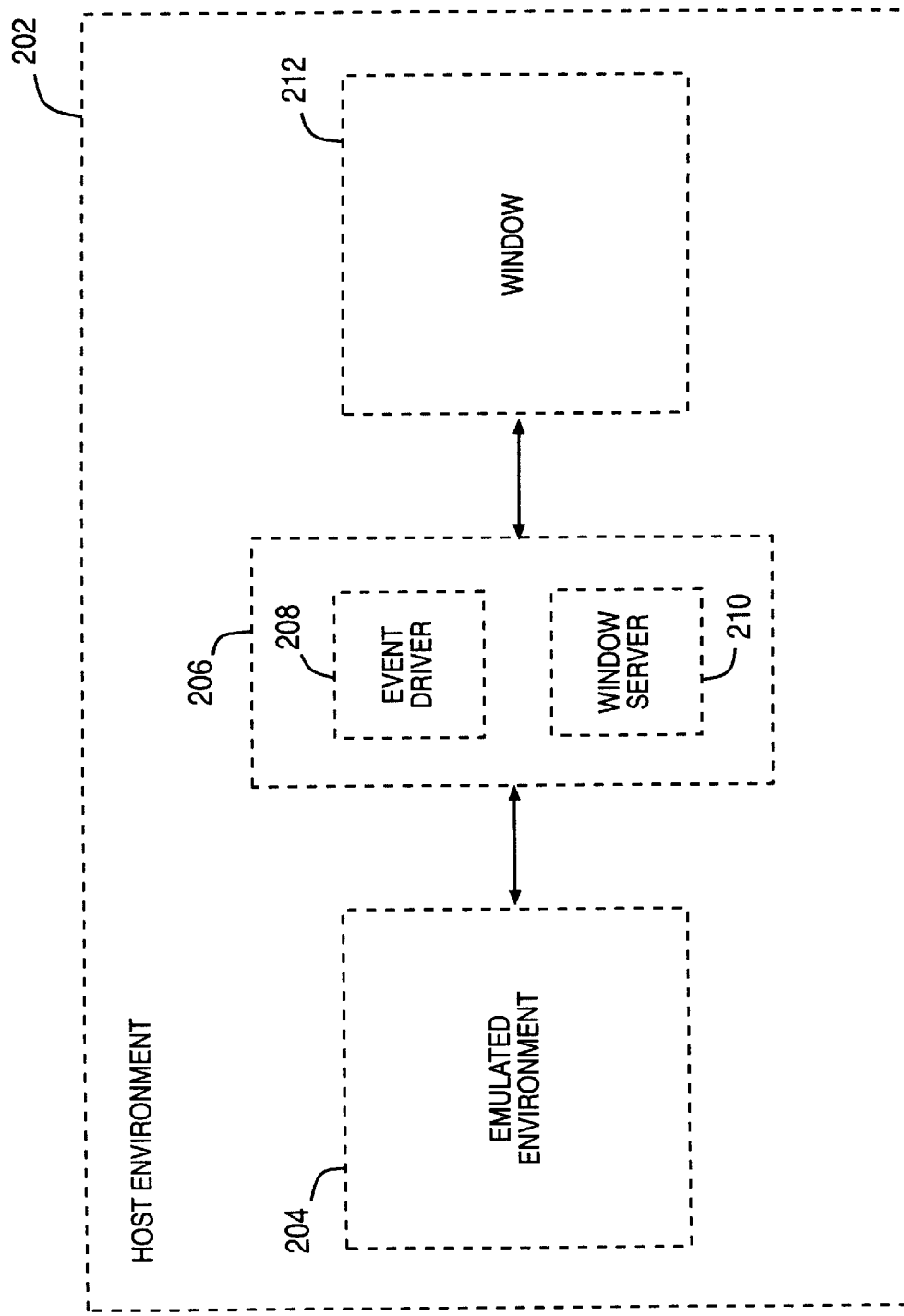
FIG. 2A provides a block-level example of an embodiment of the present invention.

FIG. 2A provides a block-level example of an embodiment of the present invention. Host environment 202 includes the hardware and software functionality for emulating environment 204. Host environment 202 is, for example, a Solaris operating environment such as Solaris 2.x running OpenWindows and X11/DPS. Emulated environment 204 runs in host environment 202. Emulated environment 204 is, for example, NeXTStep Environment 3.2 with Mach port emulation from Portable Distributed Objects.

The output generated by emulated environment 204 is displayed in window 212 of host environment 202. Input/Output (I/O) interface 206 processes the output of environment 204 displayed on window 212. Further, I/O Interface 206 processes the input received from window 212. I/O interface 206 includes event driver 208 and window server 210.

User input is processed as an event by event driver 208. For example, pressing a key on the keyboard or a mouse button is considered an event. An event is received by host environment 202. Event driver 208 is used to translate an event of host environment 202 to an event of emulated environment 204.

A translated event, an event of emulated environment 204, is transmitted to Window server 210. Window server 210 transmits events to the applications running in emulated environment 204 for processing.

In addition, window server 210 maps output generated in the emulated environment 204 onto window 212. The output generated by emulated environment 204 is, for example, in the form of Postscript commands. Window server 210 receives the Postscript output of emulated environment 204. The Postscript output generated by the emulated environment 204 is used to generate output to window 212 using the resources of host environment 202. Thus, host environment 202 draws images on window 212 based on the Postscript output generated by emulated environment 204.

It should be apparent that host environment 202 can be host to multiple instances of the emulated environment 204. That is, another instance of emulated environment 204 can be executing in host environment 202. In such a case, another instance of window 212 is used to display output and accept input. It is possible to use I/O interface 206 to manage multiple instances of emulated environment 204 and window 212. Alternatively, a separate instance of I/O interface 206 can be used for each instance of emulated environment 204 and any associated instances of window 212.

Figure 2B:
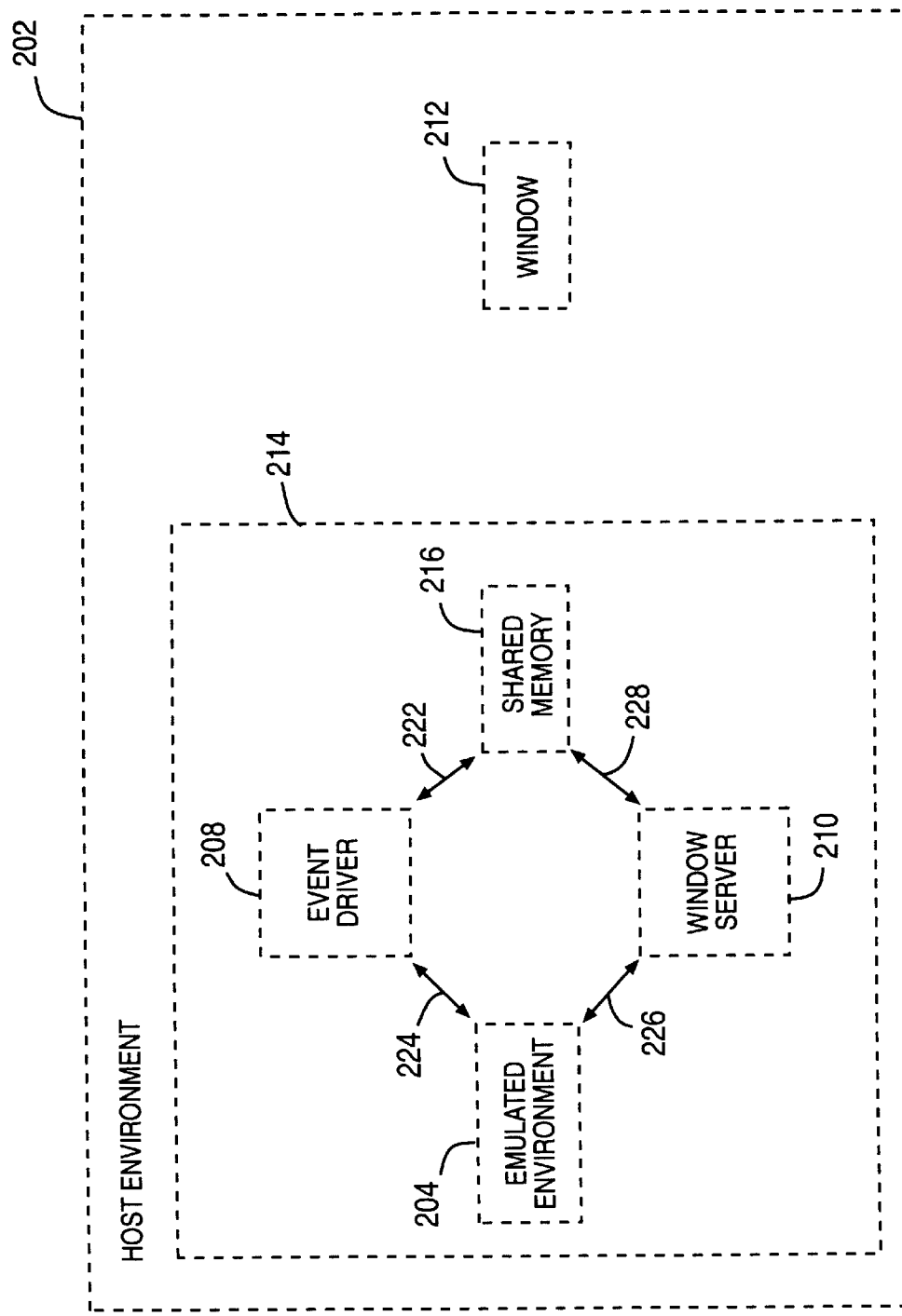
FIG. 2B provides an example of event transmission using shared memory in accordance with an embodiment of the present invention.

As described above, an input from window 212 is translated by event driver 208. The translated event is processed by window server 210. Thus, an event translated by event driver 208 is transmitted to window server 210. Preferably, a translated event is transmitted from event driver 208 to window server 210 using shared memory, or memory that is accessible by both window server 210 and event driver 208. FIG. 2B provides an example of event transmission using shared memory in accordance with an embodiment of the present invention.

Instance 214 contains an instance of emulated environment 204, window server 210, and event driver 208 as described above. In addition, instance 214 includes shared memory 216. Window server 210 and event driver 208 attach to shared memory 216 as illustrated by connections 222 and 228. Connections 222 and 228 can be implemented in any manner used by the host environment 202 to attach a process to shared, or global, memory. Event driver 208 takes an event of window 212 and translates the event into an event for emulated environment 204. The translated event is stored in shared memory 216.

Event driver 208 notifies window server 210 that an event is queued in shared memory 216. Preferably, this notification is performed using an interprocess communication (IPC) mechanism. For example, event driver 208 can notify window server 210 via an IPC mechanism used by emulated environment 204. Use of an IPC mechanism for communication between event driver 208 and window server is illustrated by lines 224 and 226. In addition, the same IPC mechanism can be used by window server 210 to communicate with applications executing in emulated environment 204.

To further illustrate, emulated environment 204 is, for example, the NeXTStep environment with Mach emulation provided by NeXT's Portable Distributed Objects product In this case, the IPC mechanism is a port structure. A port structure is a communication channel that has an associated message queue. The communication channel includes a message server and a port.

The port structure is created using the port creation mechanism provided in the emulated environment. Once the port is created, event driver 208 can use the port to communicate with window server 210. To communicate with window server 210, event driver 208 asks for sending rights to an existing port. Event driver 208 then sends a message to window server 210 via the port. The message notifies window server 210 that an event is queued in shared memory 216.

EVENT DRIVER

The event driver is invoked by the window server. The event driver connects to the window server via an IPC mechanism and attaches to the shared memory area. Within the shared memory is a global event area.

During its initialization, the event driver configures itself to read window events. Thus, when the mouse or keyboard input occurs within a window of the emulated environment, the event driver intercepts the input. The intercepted input is then translated from a host environment event to an emulated environment event by the event driver.

The event driver stores a translated event in shared memory. It sends a message to the window server to read and process the event. The event driver can send a separate message for each event that it stores in the shared memory. Preferably, however, the event driver optimizes communication with the window server. For example, the event driver queues as many events as it has and that can be stored in shared memory before it sends a message to the window server.

Figure 3:
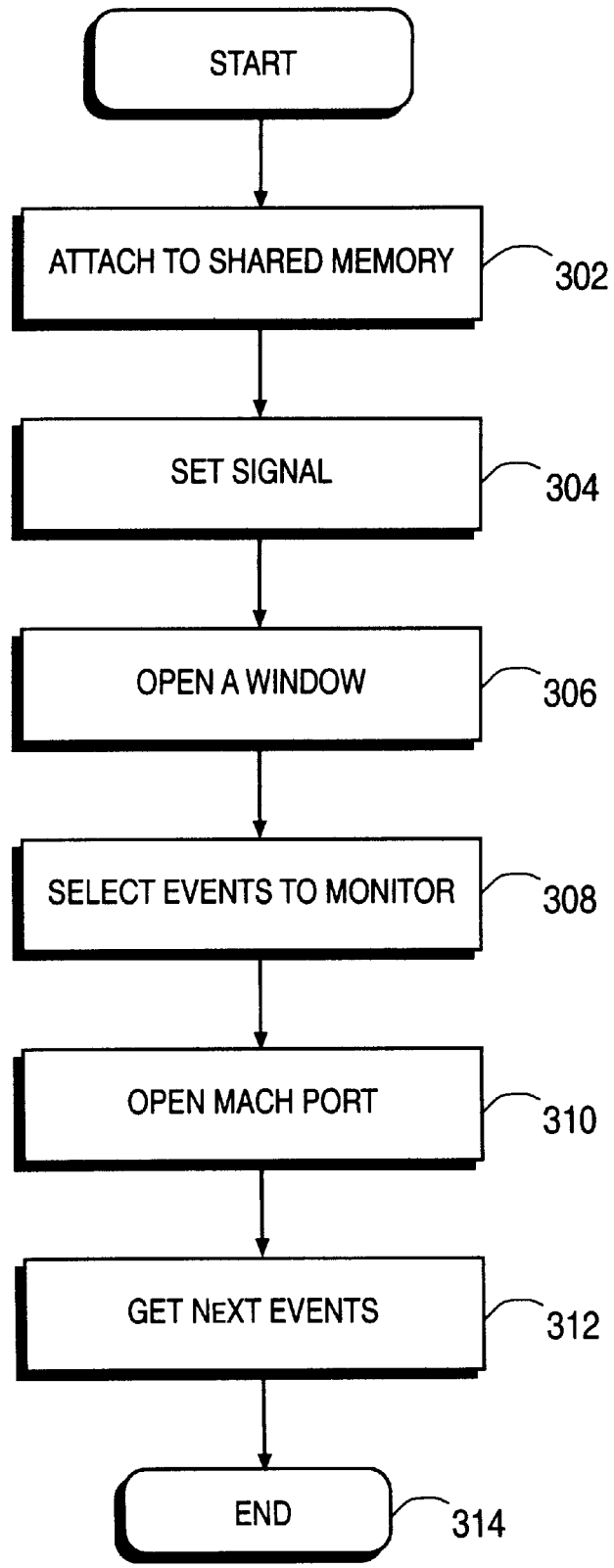
FIG. 3 provides an example of a process flow for an event driver in accordance with embodiments of the present invention.

FIG. 3 provides an example of a process flow for an event driver in accordance with embodiments of the present invention. (Appendix A contains sample code for an event driver.) At step 302, the event driver attaches to shared memory. At step 304, various signals (e.g., a system-level signal such as "bus error") are identified for capture and handling, if they occur during processing. If one of these signals is encountered during processing, a signal handler is invoked. The signal handler can free shared memory and stop the processes, for example.

At step 306, a window of the emulated environment is opened. Type of events that are to be trapped and processed by the event driver are selected at step 308. A communication path (e.g., a port) is opened at step 310. At step 312, the event driver waits for events (see Wait For Event below). Processing ends at step 314.

Wait For Event

Figure 4:
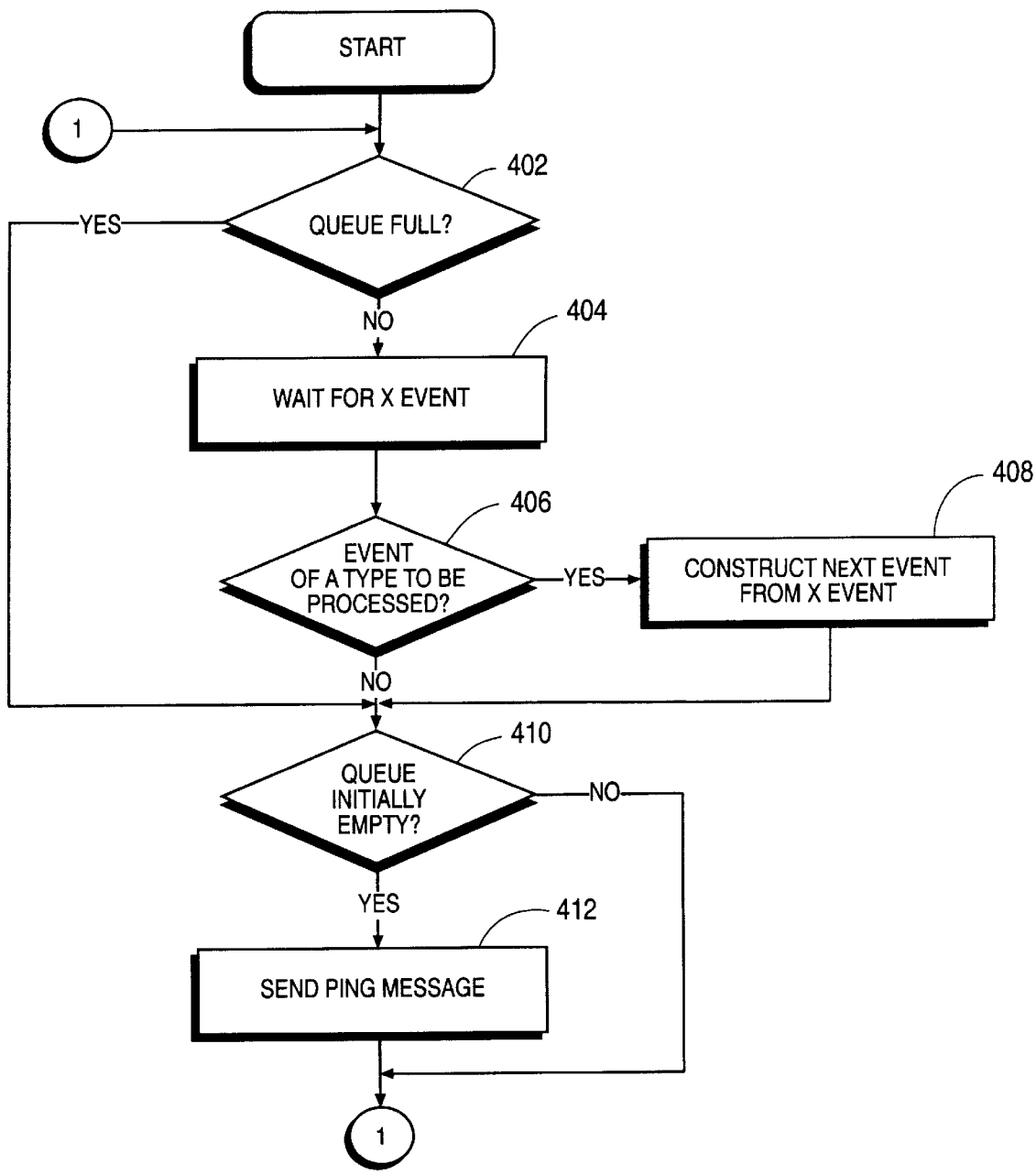
FIG. 4 provides a process flow for processing an event according to an embodiment of the present invention.
Figure 5A:
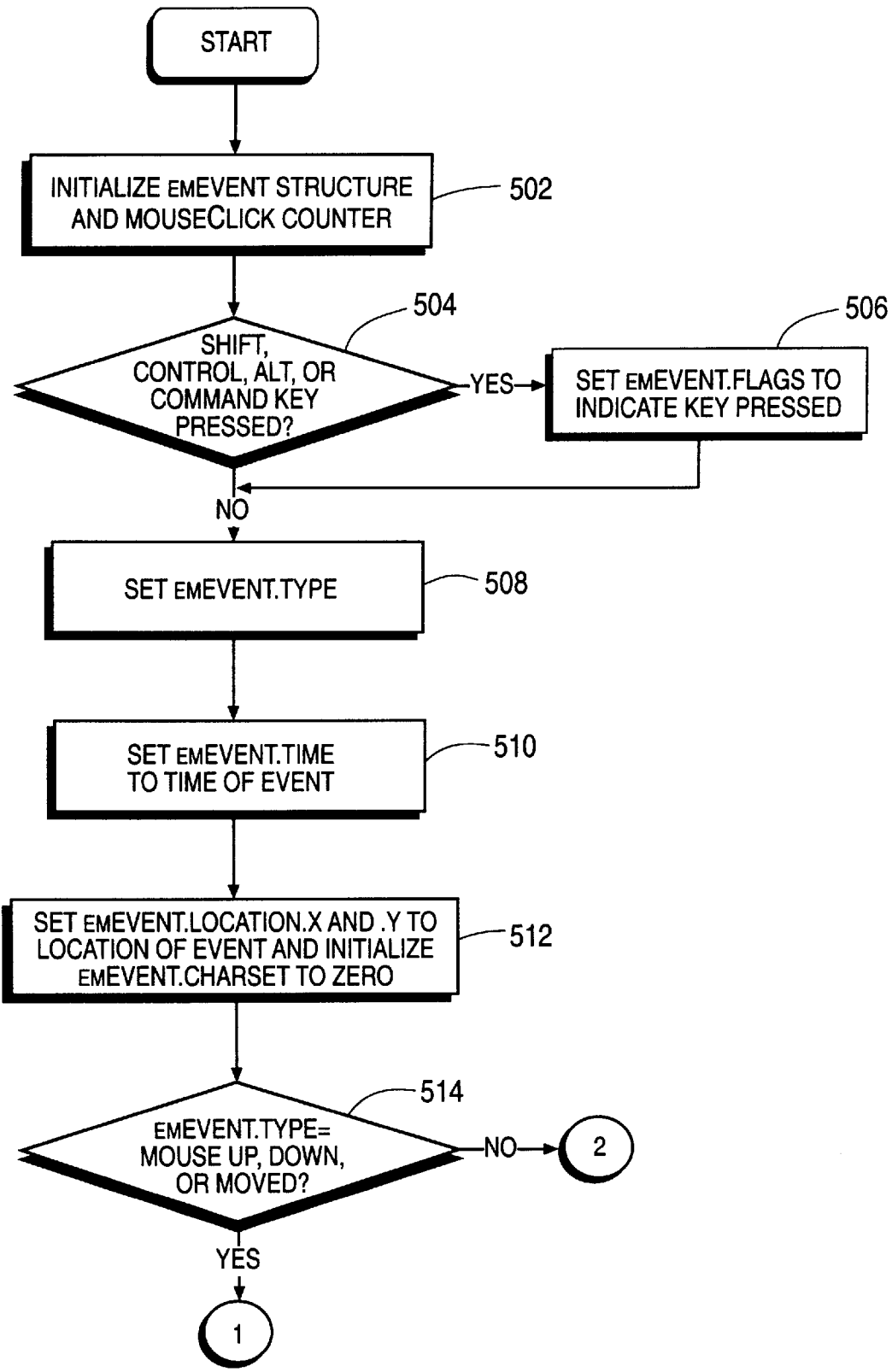
FIGS. 5A–5E provide a process flow in accordance with an embodiment of the present invention for translating an event for use in the emulated environment.
Figure 5B:
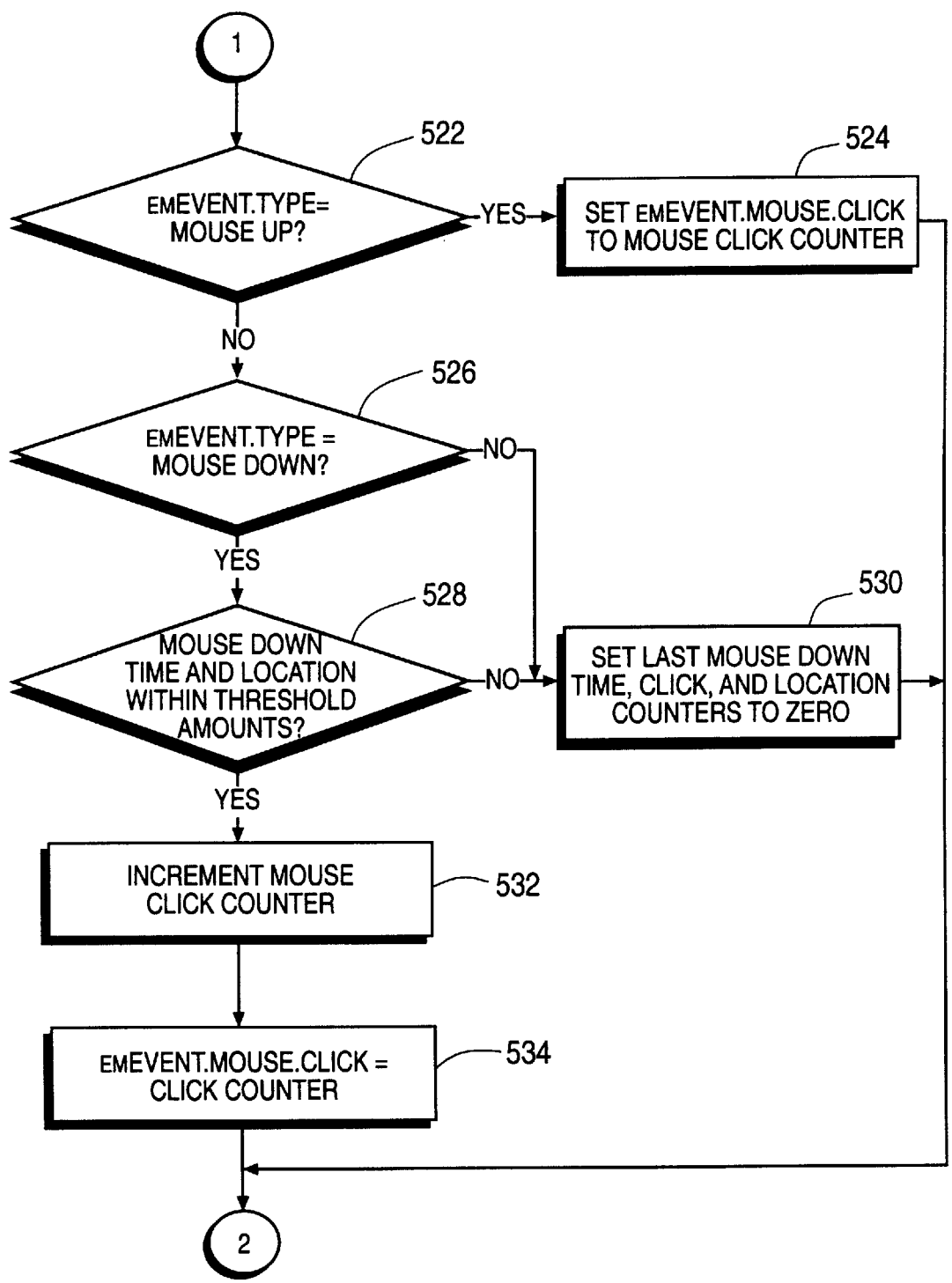
Figure 5C:
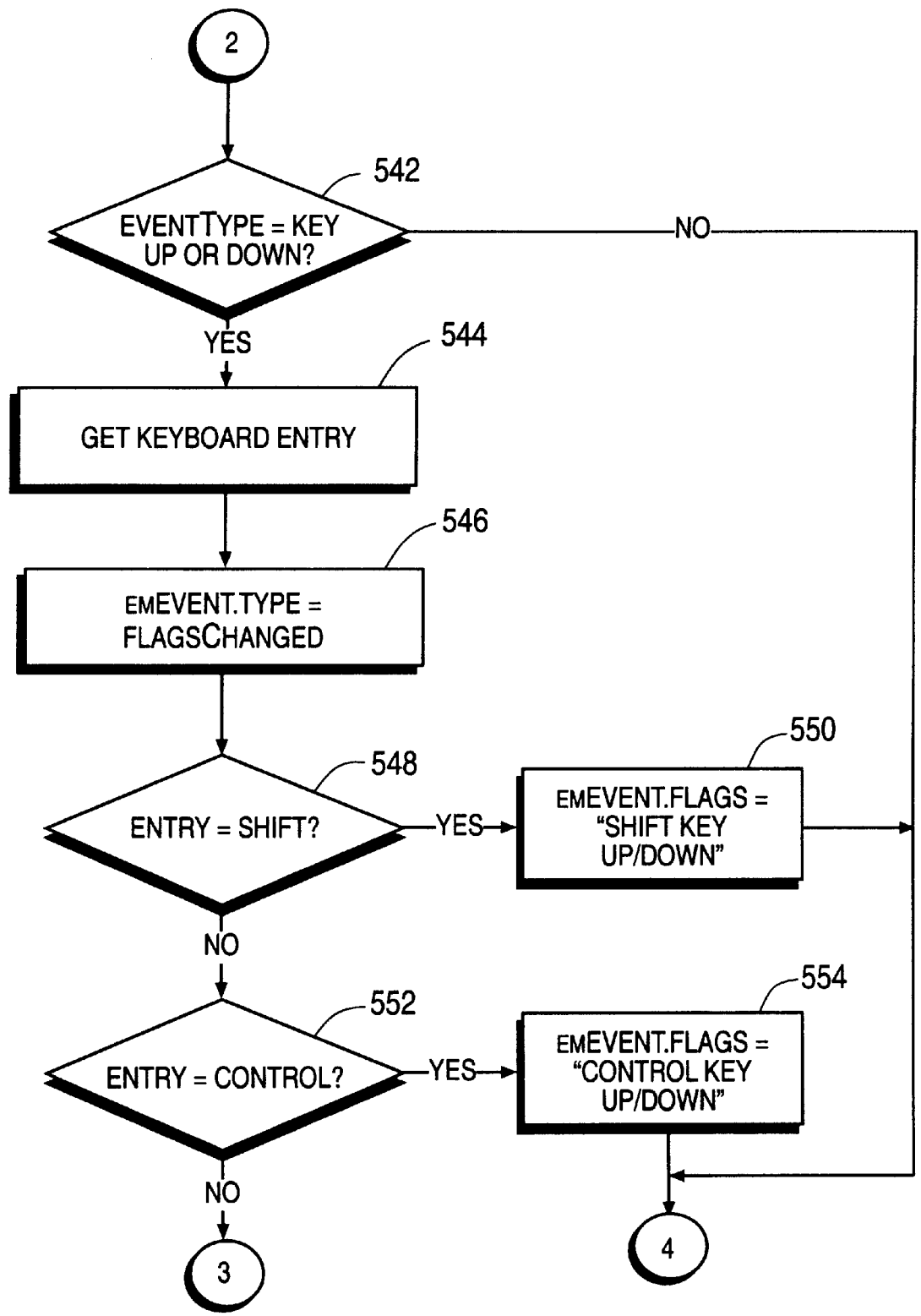
Figure 5D:
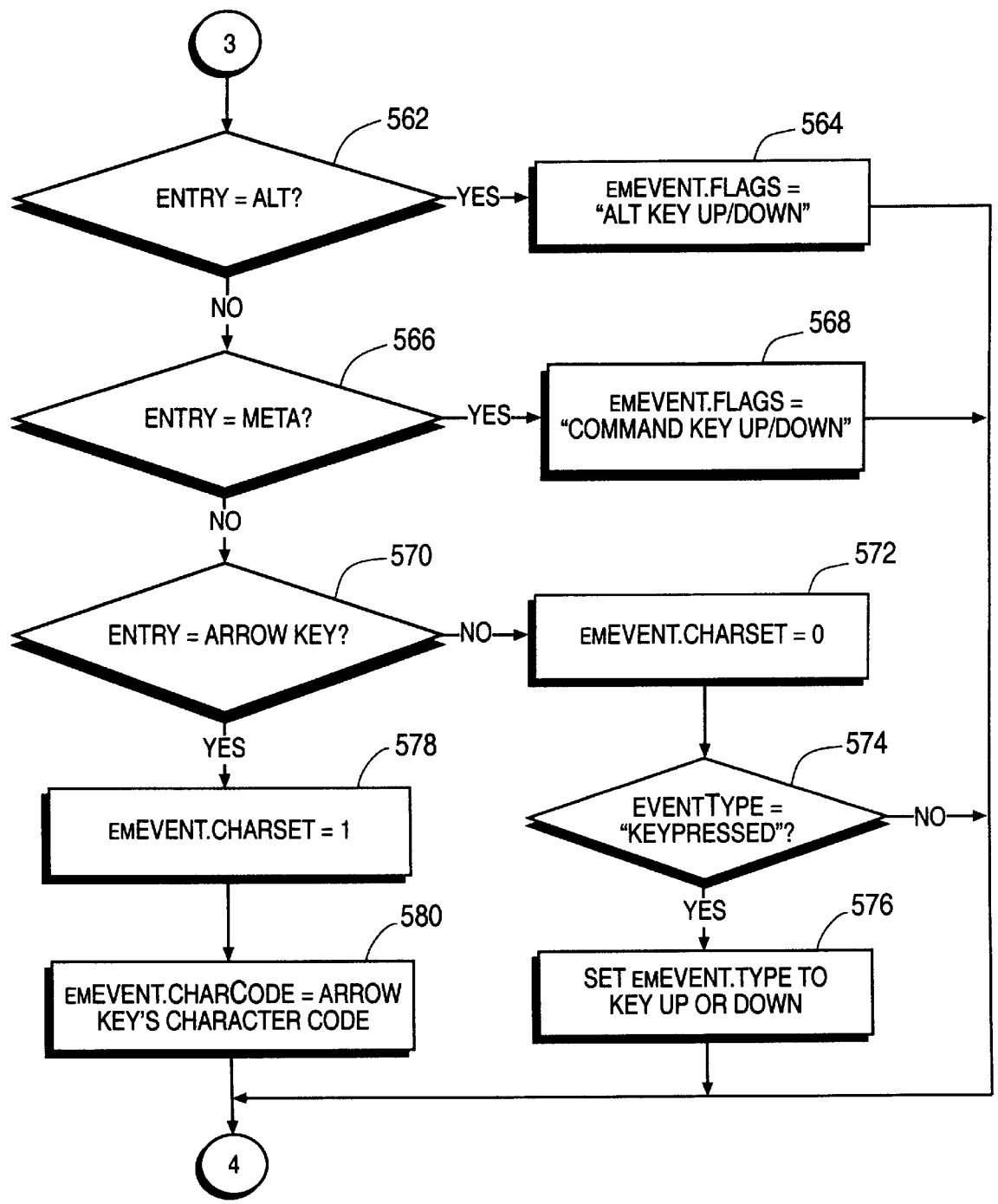
Figure 5E:
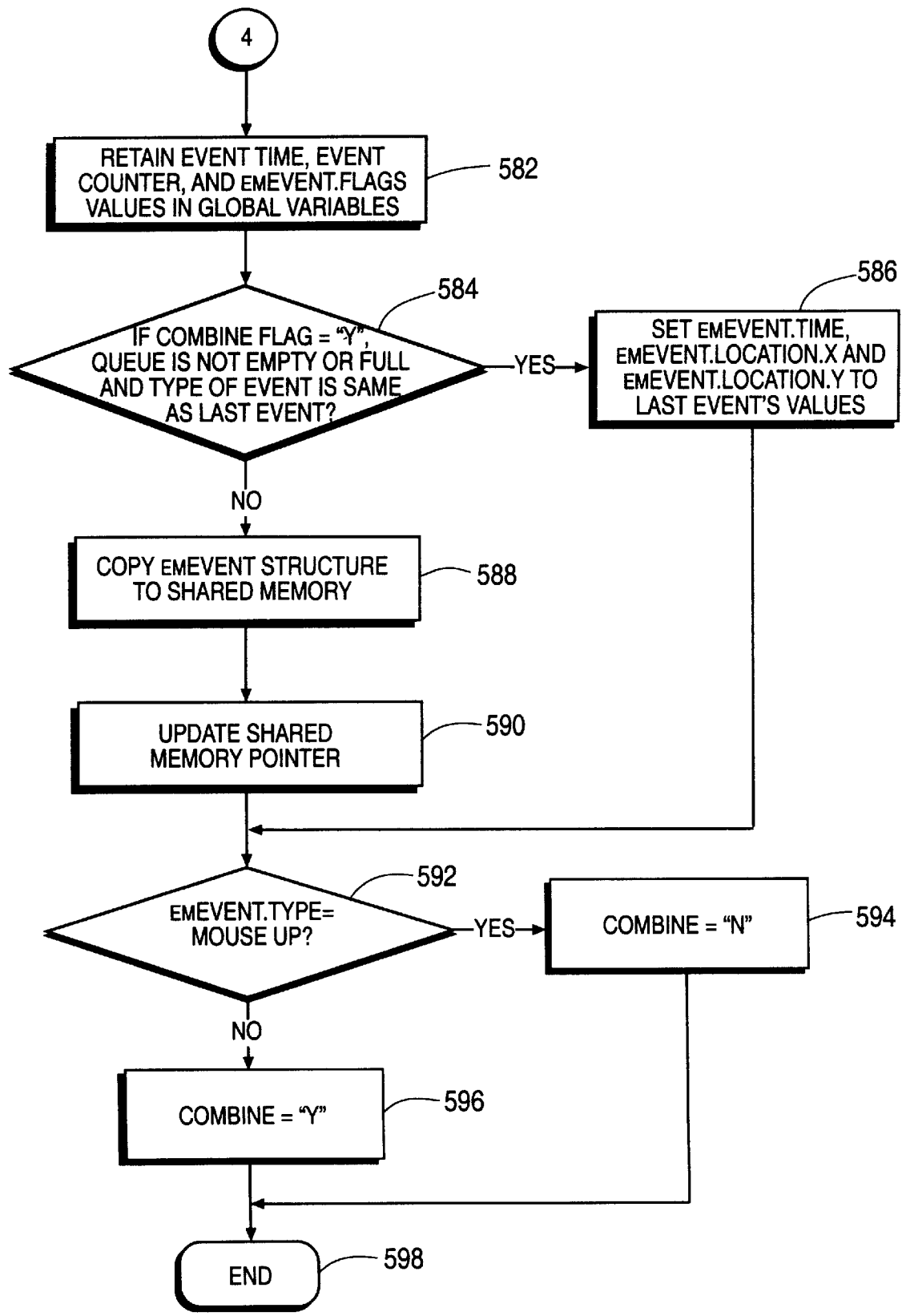
Figure 6A:
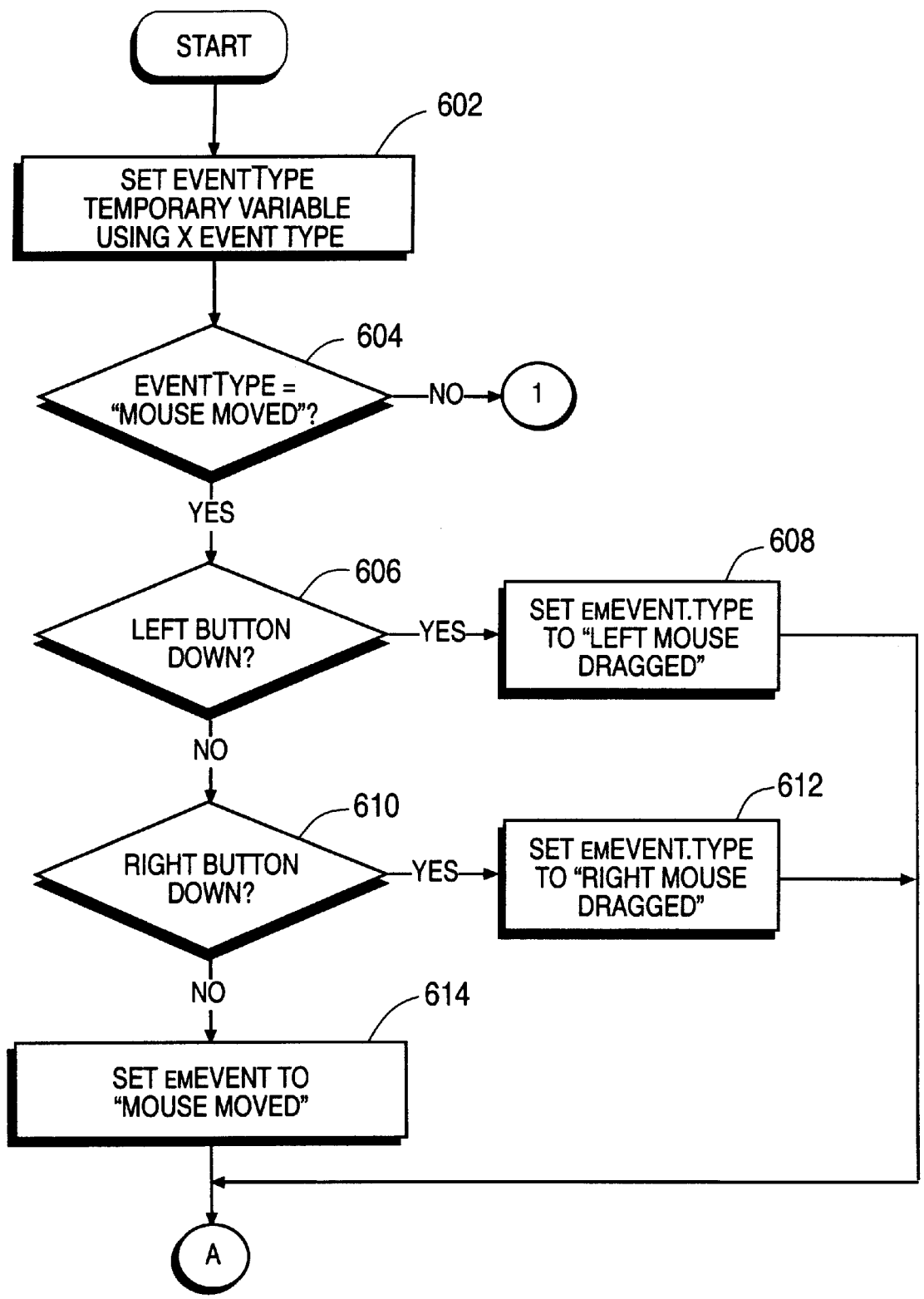
FIGS. 6A–6D provide a process flow for determining the emulated environment's event type according to an embodiment of the present invention.
Figure 6B:
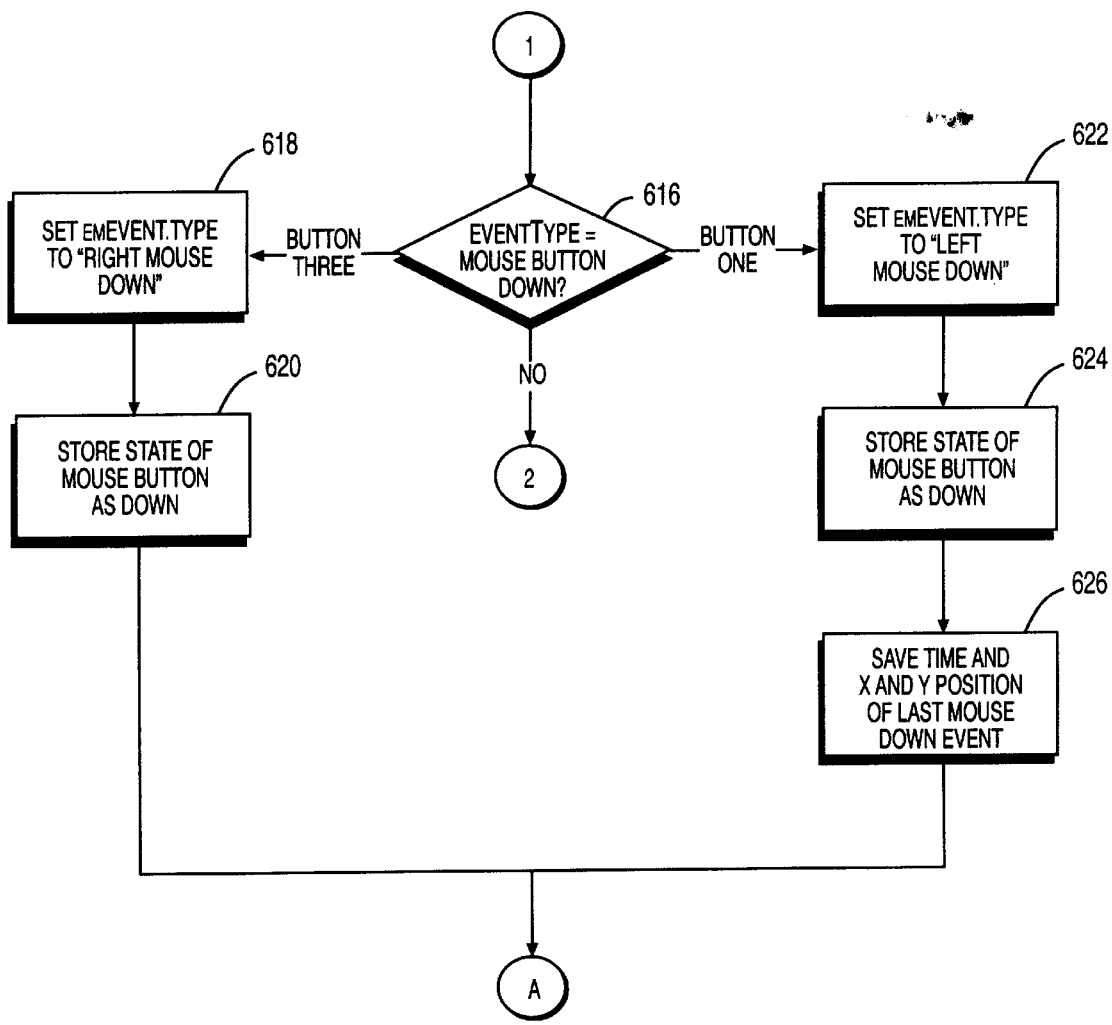
Figure 6C:
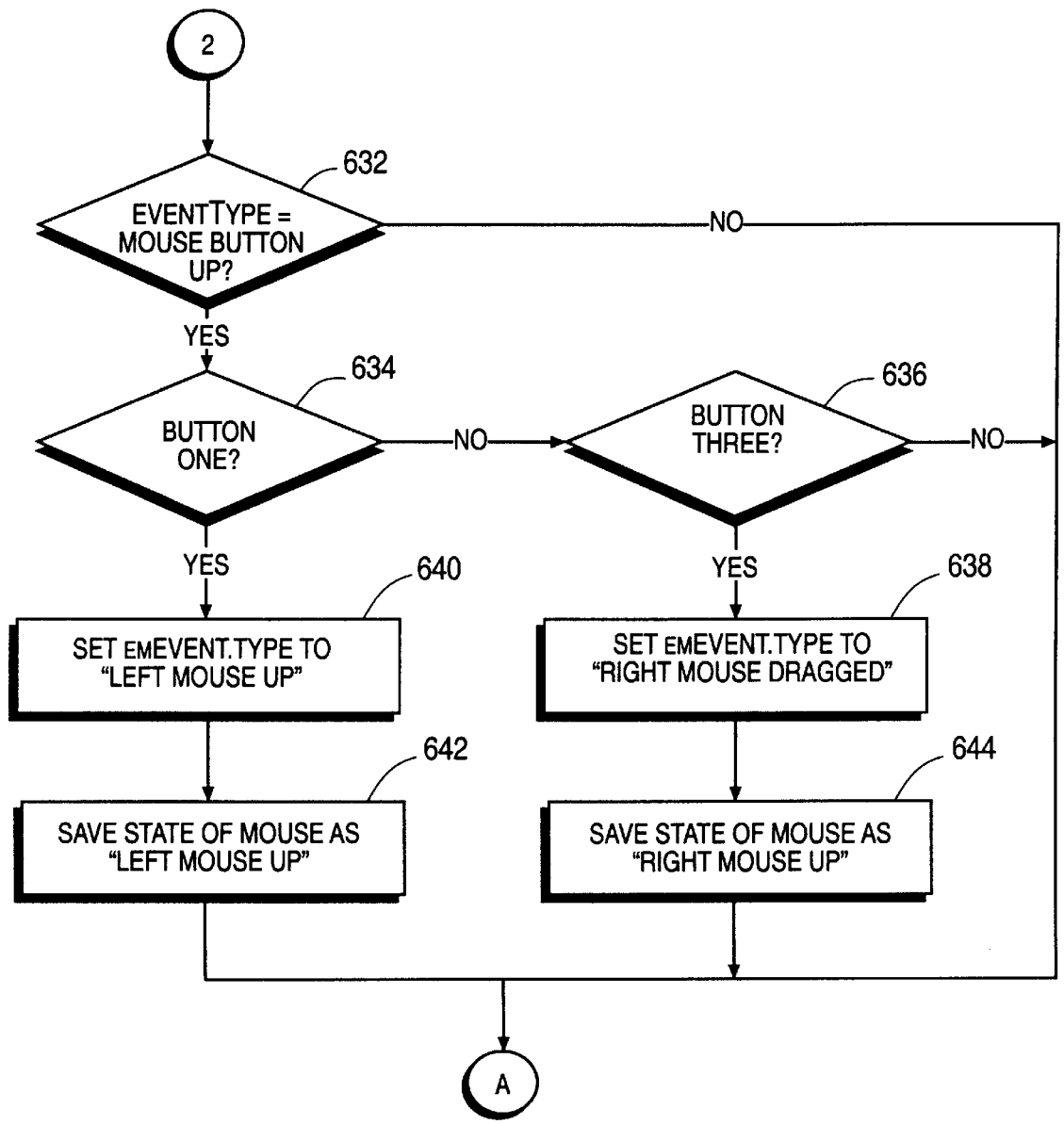
Figure 6D:
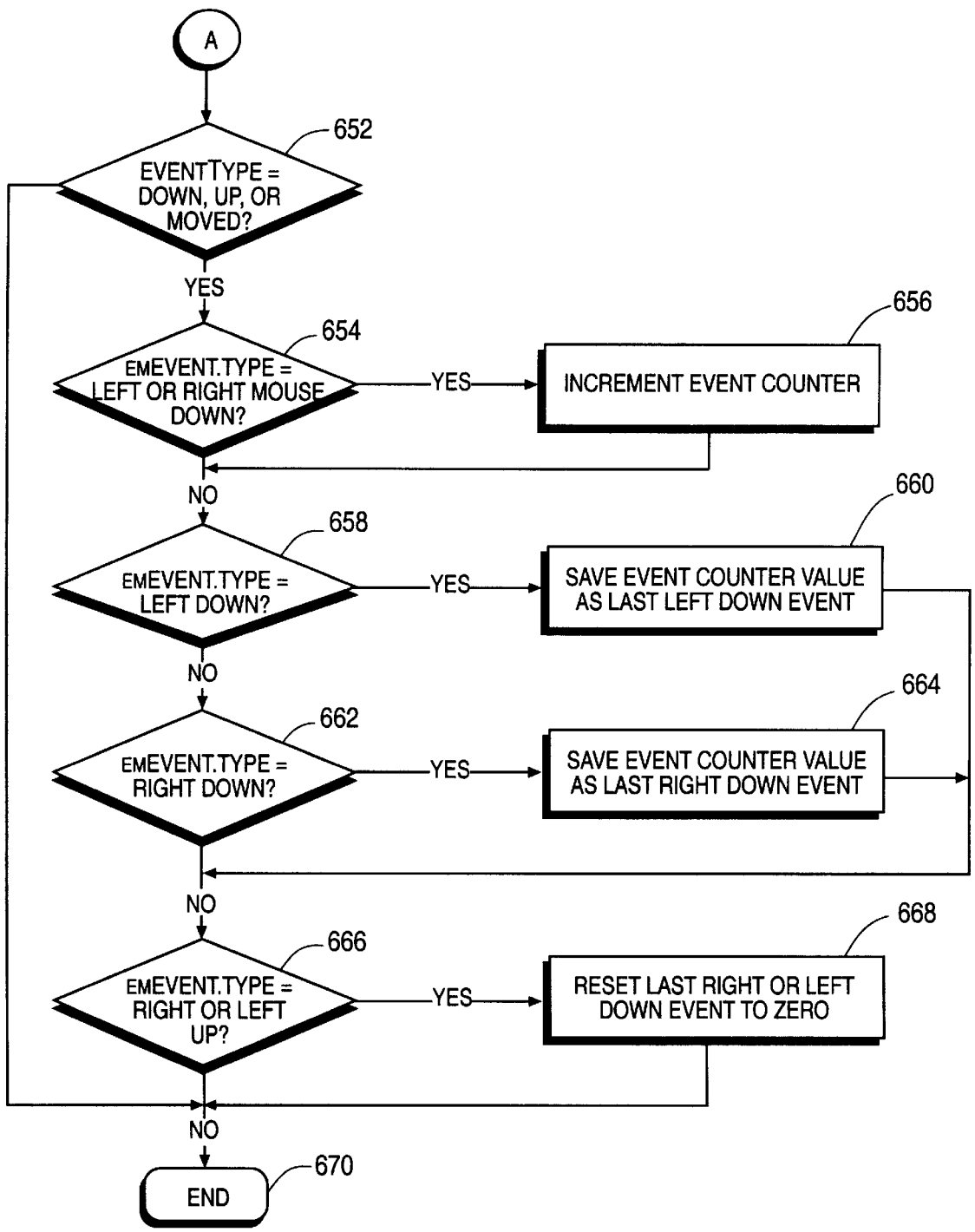

As indicated by step 312, the event driver waits for an event. When an event is received, the event driver processes the event. FIG. 4 provides a process flow for processing an event according to an embodiment of the present invention.

At step 402 (i.e., "queue full?"), a determination is made whether the shared memory area used to store events is full. If it is full, processing continues at step 410. If it is not full, processing continues at step 404 to wait for an event. When an event is received, processing continues at step 406. A determination is made at step 406 (i.e., "event of a type to be processed?") whether the event received is to be processed by the event driver. If it is not, processing continues at step 410. If it is an event that should be processed by the event driver, processing continues at step 408 to use the host environment's event to construct an event for the emulated environment (see Event Translation below). Processing continues at step 410.

At step 410 (i.e., "queue initially empty?"), the event driver makes a determination whether the shared memory event storage area was initially empty. If it was not initially empty, processing continues at step 402. If the queue was initially empty, processing continues at step 412 to send a message to the window server as a "wake up" call. The "wake up" call is used to inform the window server that the queue contains one or more events. Processing continues at step 402.

Event Translation

When an event is received, the event driver translates the event for use in the emulated environment. FIGS. 5A–5E provide a process flow in accordance with an embodiment of the present invention for translating an event for use in the emulated environment.

At step 502, a structure used to store event information for the emulated environment is initialized. At step 504 (i.e., "shift, control, alt, or command key pressed?"), a determination is made whether a special key was pressed, or released, thereby causing an event. If it was, processing continues at step 506 to set a flag in the event structure. Processing continues at step 508. If a special key was not used, processing continues at step 508.

At step 508, the event driver determines the event type (see Event Type Determination below). At step 510, the time of the event is stored in the emulated event's structure. At step 512, the location of the event is stored in the emulated event's structure. An event consisting of keyboard input can include a set of characters. A flag indicating that a character set was entered is initialized to zero to indicate that the character set is empty at step 512.

At step 514 (i.e., "emEvent.type=mouse up, down, or moved?"), a determination is made whether the emulated event's type consists of mouse "up", "down", or "moved" input. If not processing continues at step 542. If the emulated event's type is a mouse "up", "down", or "moved" input, processing continues at step 522 to process mouse input. At step 522 (i.e., "emEvent.type=mouse up?"), a determination is made whether the mouse input consists of a "mouse up" event. If it does, processing continues at step 524 to store the current value of a counter representing the number of successive mouse clicks in the emulated event's structure. Processing continues at step 542.

If, at step 522, it is determined that the event does not consist of a "mouse up" event, processing continues at step 526. At step 526 (i.e., "emEvent.type=mouse down?"), a determination is made whether the mouse input consists of a "mouse down" event. If it does not, processing continues at step 530 to initialize counters (e.g., time of last "mouse down", click counters and location variables). Processing continues at step 542.

If, at step 526, it is determined that the event does consist of a "mouse down" event, processing continues at step 528. At step 528 (i.e., "mouse down time and location within threshold amounts?"), a determination is made whether the current "mouse down" event is within acceptable time and location thresholds compared to the last mouse down event. That is, is this event a component of a multiple mouse click event. If it is not, processing continues at step 530 to reset the time, click and location counters to zero.

If the "mouse down" event is a component of a multiple mouse click event, processing continues at step 532 to increment the click counter. At step 534, the number of mouse clicks in the emulated event structure is set to the current value of the click counter. Processing continues at step 542.

At step 542 (i.e., "eventType=key up or down?"), if the event does not consist of "key up" or "key down" keyboard entry, processing continues at step 582. If it does, processing continues at step 544 to get the keyboard entry. At step 546, the event type in the emulated event structure is initialized to "flagschanged" to indicate that a special key was used. Subsequent processing performs tests to modify the initialized value of "flagsChanged", if necessary. At step 548 (i.e., "entry=shift?"), a determination is made whether the keyboard entry involved the "shift" key. If it did, processing continues at step 550 to set the flags field of the emulated event structure. The flags field is set based on whether the "shift" key was pressed or released. If the "shift" key is pressed, the flags field is set to indicate that the "shift" key was pressed. Otherwise, the flags field indicates that the "shift" key was released. Processing continues at step 582.

If, at step 548, it is determined that the keyboard entry did not involve the "shift" key, processing continues at step 552. At step 552 (i.e., "entry=control?"), a determination is made whether the "control" key was used. If it was, processing continues at step 554 to set the flags field of the emulated event structure. If the "control" key was pressed, the flags field is set to indicate that the "control" key was pressed. Otherwise, the flags field indicates that the "control" key was released. Processing continues at step 582.

If, at step 552, it is determined that the keyboard entry did not involve the "control" key, processing continues at step 562. At step 562 (i.e., "entry=alt?"), a determination is made whether use of the "alt" key caused the event. If it did, processing continues at step 564 to set the flags field of the emulated event structure. If the "alt" key was pressed, the flags field is set to indicate that the "alt" key was pressed. Otherwise, the flags field indicates that the "alt" key was released. Processing continues at step 582.

If, at step 562, it is determined that the keyboard entry did not involve the "alt" key, processing continues at step 566. At step 566 (i.e., "entry=meta?"), a determination is made whether use of the "meta" key caused the event. If it did, processing continues at step 564 to set the flags field of the emulated event structure. If the "meta" key was pressed, the flags field is set to indicate that the "meta" key was pressed. Otherwise, the flags field indicates that the "meta" key was released. Processing continues at step 582.

If, at step 566, it is determined that the keyboard entry did not involve the "meta" key, processing continues at step 570. At step 570 (i.e., "entry=arrow key?"), a determination is made whether an arrow key caused the event. If not, processing continues at step 572 to reset the character set variable in the emulated event structure to zero. At step 574 (i.e., "eventType='keypressed'?"), a determination is made whether the host environment's event type indicated that a key was used. If so, processing continues at step 576 to set the type of event in the emulated event structure to indicated that a key was either pressed or released. Processing continues at step 582.

If, at step 570, it is determined that an arrow key was used, processing continues at step 587. At step 587, a flag that indicates that a character set is the result of the event. Processing continues at step 580 to place the character code that represents the arrow key used in the emulated event structure. Processing continues at step 582.

At step 582, the current event's time, event counter, and event flags values are stored in global variables. At step 584 (i.e., "if combine flag='Y', queue is not empty or full and type of event is same as last event?"), a determination is made whether to combine the current event with previous event(s). A test is made to determine whether the event can be combined with the previous event(s). If so, the event is combined. At step 586, the current event's information is modified to reflect the last event's information in the emulated event structure. Processing continues at step 592.

If it is determined that the current event cannot be combined with the previous event(s), processing continues at step 588 to copy the contents of the emulated event structure into shared memory. At step 590, the pointer to the last event in shared memory is updated. Processing continues at step 592.

At step 592 (i.e., "emEvent type=mouse up?"), if the event type of the current event is a "mouse up", processing continues at step 594 to set the combine flag to "N". Therefore, this event cannot be combined with the next event). If it is not a "mouse up" event, processing continues at step 596 to set the combine flag to "Y". This event may be combined with a succeeding event. Processing ends at step 598.

Event Type Determination

As previously indicated, the event driver determines the type of event using the host environment's event information. FIGS. 6A–6D provide a process flow for determining the emulated environment's event type according to one embodiment of the present invention.

At step 602, a temporary variable, eventType, is set based on the host environment's type determination. For example, a "keyPress", "keyRelease", "motionNotify", "buttonPress", and "buttonRelease", host environment event type results in a "keyDown", "keyUp", "mouseMoved", "mouseDown", and "mouseUp" setting, respectively, in the eventType temporary variable. Processing continues at step 604.

At step 604 (i.e., "eventType='mouse moved'?"), a determination is made whether the type of event was caused by movement of the mouse. If not, processing continues at step 616. If so, processing continues at step 606 to determine whether the event was part of a "mouse drag" operation. At step 606 (i.e., "left button down?"), if the left mouse button was pressed, processing continues at step 608 to set the event type in the emulated event structure to indicate that the mouse was dragged (i.e., mouse movement while the mouse button is depressed). Processing continues at step 652.

If the mouse was moved and it was not while the left button was depressed, processing continues at step 610. At step 610 (i.e., "right button down?"), a determination is made whether the mouse was moved while the right button was depressed. If not, processing continues at step 614 to set the event type in the emulated event structure to indicate that the mouse was moved. Processing continues at step 652. If the mouse was moved while the right button was depressed, processing continues at step 612 to set the event type to indicate that the mouse was dragged while the right button was depressed. Processing continues at step 652.

If at step 604 it is determined that the host environment's event type does not indicate that the mouse was moved, processing continues at step 616. At step 616 (i.e., "eventType=mouse button down?"), a determination is made whether the event was caused by pressing either the right or left mouse button. If not, processing continues at step 632. If so, processing continues at steps 618 or 622 depending on which button is pressed. If the right mouse button is pressed, processing continues at step 618 to so indicate in the emulated event structure. At step 620, the fact that the mouse button is depressed is stored in a global variable. If the left mouse button is pressed, processing continues at step 624 to so indicate in the emulated event structure. At step 626, the time, and location of the last mouse down event is stored in global variables. Processing continues at step 652.

If, at step 616, it is determined that the event was not caused by pressing either the right or left mouse button, processing continues at step 632. At step 632 (i.e., "eventType=mouse button up?"), a determination is made whether the event was caused by releasing the mouse button. If not, processing continues at step 652. If so, processing continues at step 634. At step 634 (i.e., "button one?"), a determination is made whether the left button was released. If it was, processing continues at step 640 to set the event type in the emulated event structure. At step 642, the state of the mouse, "left mouse up", is saved in a state variable.

If, at step 634, it is determined that button one was not released, processing continues at step 636. At step 636 (i.e., "button three?"), a determination is made whether the event was caused when the third mouse button was released. If not, processing continues at step 652. If so, processing continues at step 638 to set the event type in the emulated event structure. At step 644, the state of the mouse, "right mouse up", is saved in a state variable.

At step 652 (i.e., "eventType=down, up, or moved?"), a determination is made whether the host event was caused by moving the mouse or pressing or releasing a mouse button. If not, event type processing ends at step 670. If so, processing continues at step 654. At step 654 (i.e., "emEvent.type=left, or right mouse down?"), if the event was caused by pressing the left or right mouse buttons, processing continues at step 656 to increment the event counter. Processing continues at step 658. If not, processing continues at step 658.

At step 658 (i.e., "emEvent.type=left down?"), if the left mouse button was depressed, processing continues at step 660 to save the event counter in "LDeNum" (i.e., a variable used to indicate the last event that involved a "left mouse down" operation). Processing continues at step 666. If the left mouse button was not depressed in the current event, processing continues at step 662. At step 662 (i.e., "emEvent.type=right down?"), if the right mouse button was depressed, processing continues at step 664 to save the event counter in "RDeNum" (i.e., a variable used to indicate the last event that involved a "right mouse down" operation). Processing continues at step 666. If not, processing continues at step 666.

At step 666 (i.e., "emEvent.type=right or left up?"), a determination is made whether the event involves the release of a mouse button. If not, event type processing ends at step 670. If so, processing continues at step 668 to reset the "LDeNum" and "RDeNum" variables to zero. Event type determination processing ends at step 670.

WINDOW SERVER

In an emulated environment such as the NeXTStep environment, the window server sits in the background and handles graphic requests for a program. Everything that is seen on a user's desktop is typically drawn by the window server using a Postscript display system. Preferably, an emulated environment's window server is ported to the host environment. The ported window server emulates the Postscript display system of the emulated environment.

The window server must be modified to cause it to write to a window on the screen instead of the entire screen. Thus, a program's display output is mapped to a window of the screen. This is done transparently such that a program running in the emulated environment is unaware of how the output is being displayed.

The window server is further modified to contain logic to initiate the event driver. Events translated and stored in the shared memory are then processed by the window server. That is, the window server forwards window input to an application, for example. As previously described, the window server forwards program output to the emulated environment's window(s).

The emulated environment's window server may have routines that require an interface to the host environment system. In such a case, the window server must be modified to support access to the host environment. For example, the NeXTStep Window server is modified to use the capabilities of the host environment. The following table provides examples of the routines used by a window server to access host environment resources (code examples are contained in Appendix A).

TABLE One

| Routine | Description |
| --- | --- |
| NXEvClose | called when terminating an emulated environment; frees shared memory |
| NXEvGetParameter | called to retrieve size of emulated event structure or an identification of the last left and right mouse down events |
| NXEvMapEventShmem | returns pointer to shared memory |
| gethostid | returns identification of host machine |
| NXEvSetParameterInt | sets screen parameters such as size, shared memory size, and total screens |
| NXEvOpen | called when opening an emulated environment; allocates shared memory and attaches window server; initializes shared global event area |
| NXEvClose | called when terminating the emulated environment |

As previously indicated, an emulated environment's window server interfaces with the graphic display system of the host environment. The output from the emulated environment is displayed in a window of the host environment. Therefore, the emulated environment's window server must be modified to use the host environment's graphic display system. Postscript output generated in the emulated environment is displayed in a window of the host system. In addition, the screen registration, buffering and refreshing capabilities of the host environment can be used. The emulated environment's display resolution and color schemes must be mapped to the those of the host environment. The following table provides examples of graphic display routines for use by the Window server in the host environment (code examples are contained in Appendix A).

TABLE Two

| Routine | Description |
| --- | --- |
| createShmImage | creates area in shared memory for screen image |
| destroyShmImage | destroys area in shared memory for screen image |
| load_image | loads image from buffer to screen |
| SScolorMap | maps eight bit color to 256 gray scale |
| SSgetScreenDims | determines dimensions of screen |
| SSmakeBackingStore | make offscreen screen buffer in shared memory |
| SSopenDisplay | opens a display in host environment |
| SSRegisterScreen | registers screen in host environment |
| SSsetCursor | initializes cursor for screen in host environment |
| user_cache_flush | puts image stored in shared memory or other buffering mechanism onto screen |
| SSgetDepth | get screen depth |

Register Screen

Figure 7:
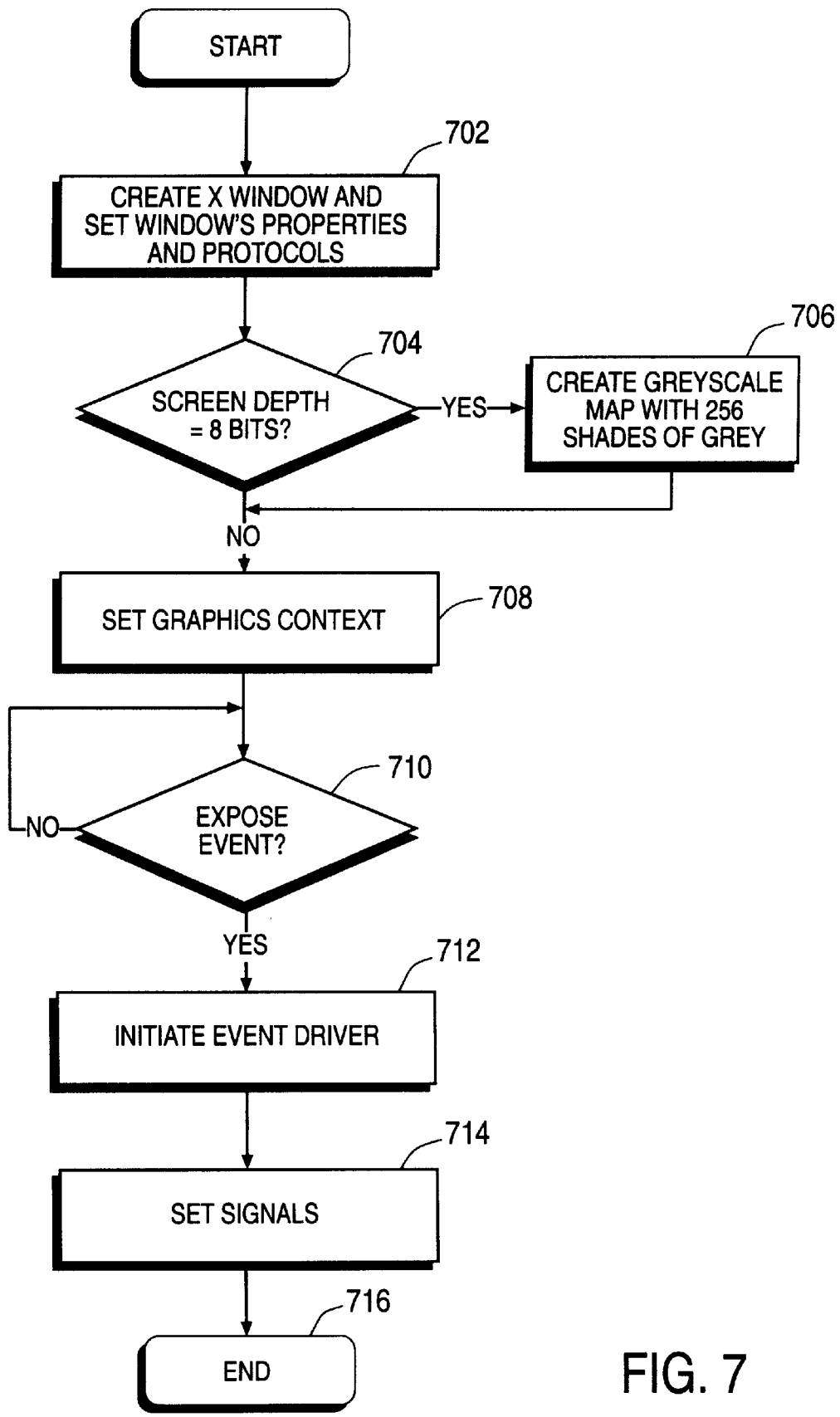
FIG. 7 provides a process flow for registering a screen according to one embodiment of the invention.

As indicated above, a screen used to display output from the emulated environment is registered in the host environment. FIG. 7 provides a process flow for registering a screen according to one embodiment of the invention. Step 702, a window is created in the host environment. The window's properties and protocols are set.

At step 704 (i.e., "screen depth=8 bits?"), a determination is made whether the screen depth is eight bits (i.e., the output cannot be displayed in a 24-bit color representation). If the screen depth is eight bits, the output is generated using a color map consisting of 256 shades of gray. That is the output is displayed using a gray scale map. At step 706, the gray scale map is created (see Color Map below). Processing continues at step 708. If the screen depth is twenty-four (24) bits, a 24-bit color representation is used. Processing continues at step 708.

At step 708, the graphics context is set. For example, fill patterns and line styles are set. At step 710 (i.e., "expose event?"), a determination is made whether the buffer containing the screen image should be displayed on the screen. Processing waits until an expose event is detected. Processing then continues at step 712. At step 712, the event driver is initiated. At step 714, signals that are to be trapped and processed during the window server processing are identified. For example, if a bus error is detected, processing continues with a signal handler that frees shared memory and terminates the event driver and window server processes. Register screen processing ends at step 716.

Color Map

Figure 8A:
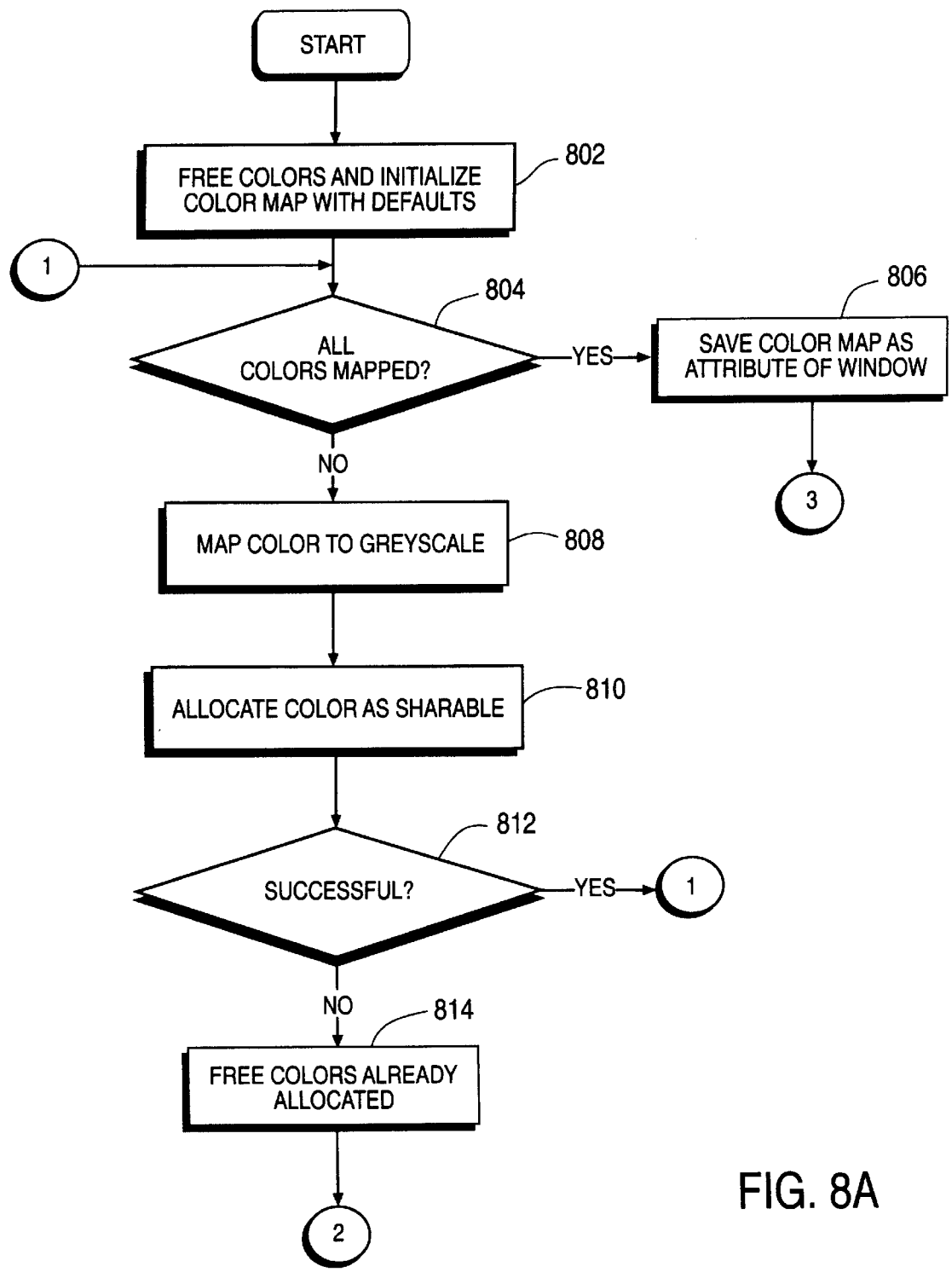
FIGS. 8A–8B provide a process flow for created a gray scale color map according to an embodiment of the invention.
Figure 8B:
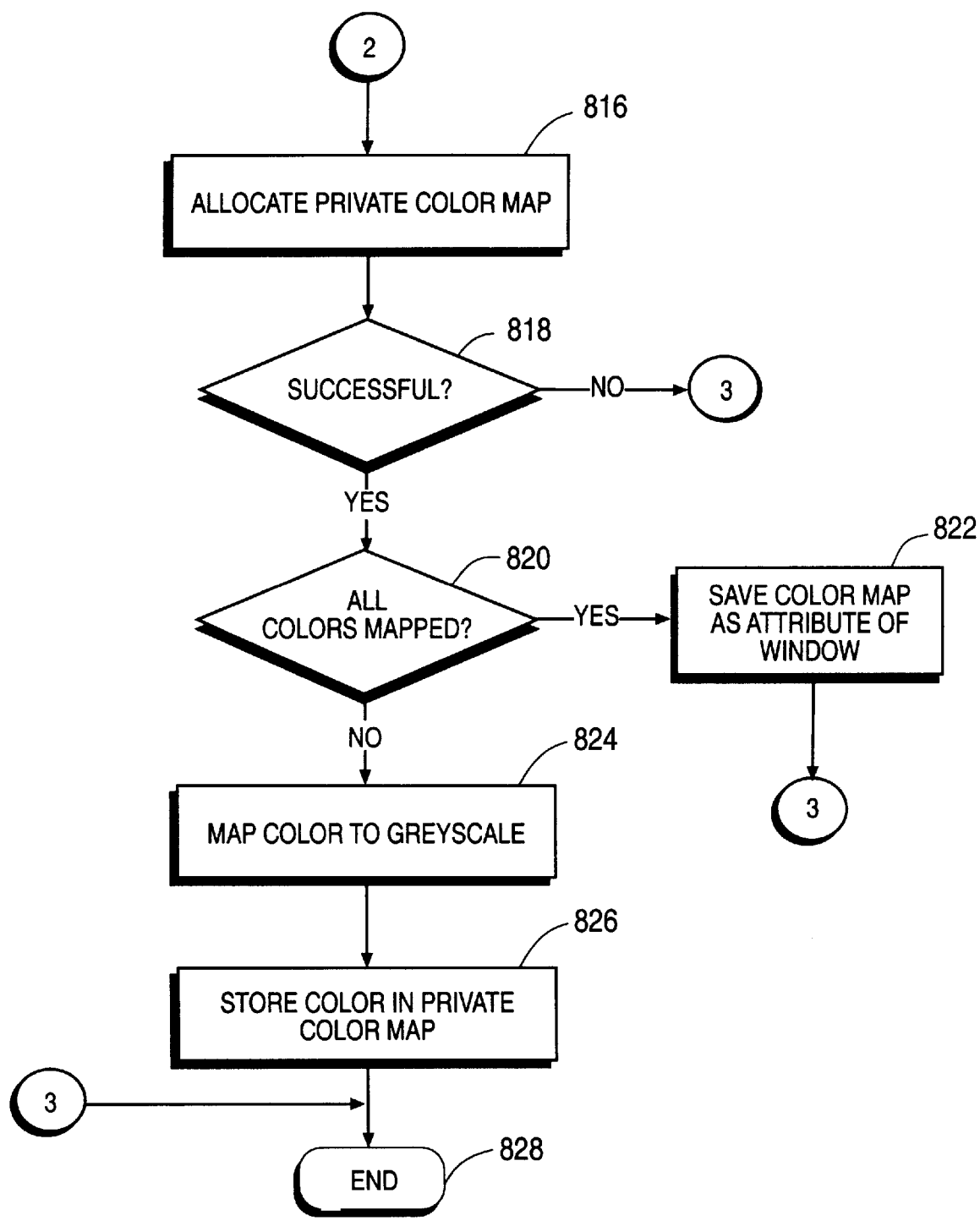

Preferably, output from the emulated environment is displayed in color using a 24-bit color representation. However, where only an 8-bit screen depth is available, colors can be mapped to 256 shades of gray. FIGS. 8A–8B provide a process flow for created a gray scale color map according to an embodiment of the invention.

At step 802, the colors and color map are freed and the color map is initialized using defaults. At step 804 (i.e., "all colors mapped?"), a determination is made whether all of the colors of the map have been mapped. If so, processing continues at step 806 to store the identity of the color map in the attributes of the window. The color map processing ends at step 828.

If all of the colors have not been mapped, processing continues at step 808. At step 808, a color is mapped to gray scale. At step 810, the mapped color is allocated in a sharable color map. At step 812 (i.e., "successful?"), a test is made whether the allocation is successful. If so, processing continues at step 804 to process the next color.

If a mapped color cannot be allocated in the sharable color map, processing continues at step 814 to attempt to allocate a non-sharable color map. At step 814, the colors already allocated in the sharable color map are freed. At step 816, a private color map is allocated. At step 818 (i.e., "successful?"), a test is made to determine whether the allocation of a private map was successful. If not, an error condition can be raised and color map processing ends at step 828.

If a private color map is successfully allocated, processing continues at step 820. At step 820 (i.e., "all colors mapped?"), a determination is made whether all of the colors of the map have been mapped. If so, processing continues at step 822 to store the identity of the color map in the attributes of the window. The color map processing ends at step 828.

If all of the colors have not been mapped, processing continues at step 824. At step 824, a color is mapped to gray scale. At step 826, the mapped color is allocated in a sharable color map. Processing continues at step 820 to process any remaining colors.

Table three contains additional routines used by the window server in the host environment. One such routine initiates the event driver. Another is used to terminate emulation. For example, when emulation is terminated, a routine is used to de-allocate shared memory regions and terminate the event driver. (Code examples are contained in Appendix A.)

TABLE Three

| Routine | Description |
| --- | --- |
| handle_message | perform a graceful close of emulation processes when "kill" message occurs |
| sig_catch | perform graceful close of emulation processes when a specified signal occurs |
| SSforkChild | initiate event driver process |
| SShandleEvents | process "kill" and screen flush events |
| SSnextEvent | get next event and return host environment's event type |

SHARED MEMORY

Preferably, shared memory is used to store events such that they are accessible by, for example, the event driver and the window server. Events can therefore by easily communicated between these processes. In addition, shared memory is preferably used to store, or buffer, images or displays. The screen is then refreshed using the buffer(s) stored in shared memory.

Sharable Event Storage

Shared memory is preferably used to store an event. As described above, the host environment's event is translated into an emulated environment's event. The translated event is stored in a region of shared memory. Multiple events can be queued in shared memory. The window server can access the same region of shared memory to retrieve and process a translated event. The following table provides an example of information that is stored in shared memory for an event according to one embodiment of the invention. (An example of code that contains shared memory declarations is contained in Appendix A.)

TABLE Four

| Name | Description |
| --- | --- |
| LLEHead | The next event to be read |
| LLETail | Where the next event will be written |
| LLELast | The last event entered |
| eNum | Unique id for mouse events |
| LDeNum | Event number for last left down |
| RDeNum | Event number for last right down |
| buttons | State of mouse buttons 1 = down, 0 = up |
| eventFlags | The current value of event.flags |
| VertRetraceClock | The current value of event.time |
| cursorSema | set to disable periodic code |
| cursorLoc | The current location of the cursor |
| frame | current cursor frame |
| workBounds | bounding box of all screens |
| mouseRect | Rect for mouse-exited events |
| wantPressure | pressure in current mouseRect |
| wantPrecision | precise coordinates in current mouseRect |
| dontWantCoalesce | coalesce within the current mouseRect |
| dontCoalesce | actual flag which determines coalescing |
| mouseRectValid | If nonzero, post a mouse-exited whenever mouse outside mouseRect |
| movedMask | This contains an event mask for the three events MOUSEMOVED LMOUSEDRAGGED, and RMOUSEDRAGGED. Determines whether driver should generate those events |
| AALastEventSent | timestamp for wait cursor |
| AALastEventConsumed | timestamp for wait cursor |
| waitCursorSema | protects wait cursor fields |
| waitCursorUp | Is wait cursor up |
| ctxtTimedOut | Has wait cursor timer expired |
| waitCursorEnabled | Play wait cursor game (per ctxt) |
| globalWaitCursorEnabled | Play wait cursor game (global) |
| waitThreshold | time before wait cursor appears |
| lleq[LLEQSIZE] | The event queue itself |

ALTERNATE EMBODIMENT

As described above, the output of an emulated environment running in a host environment is processed by a window server running in the host environment. The window server processes the output such that the output is displayed in a window of a display of the host environment. Input associated with the window results in an event that is translated by an event driver that executes in the host environment.

Figure 2C:
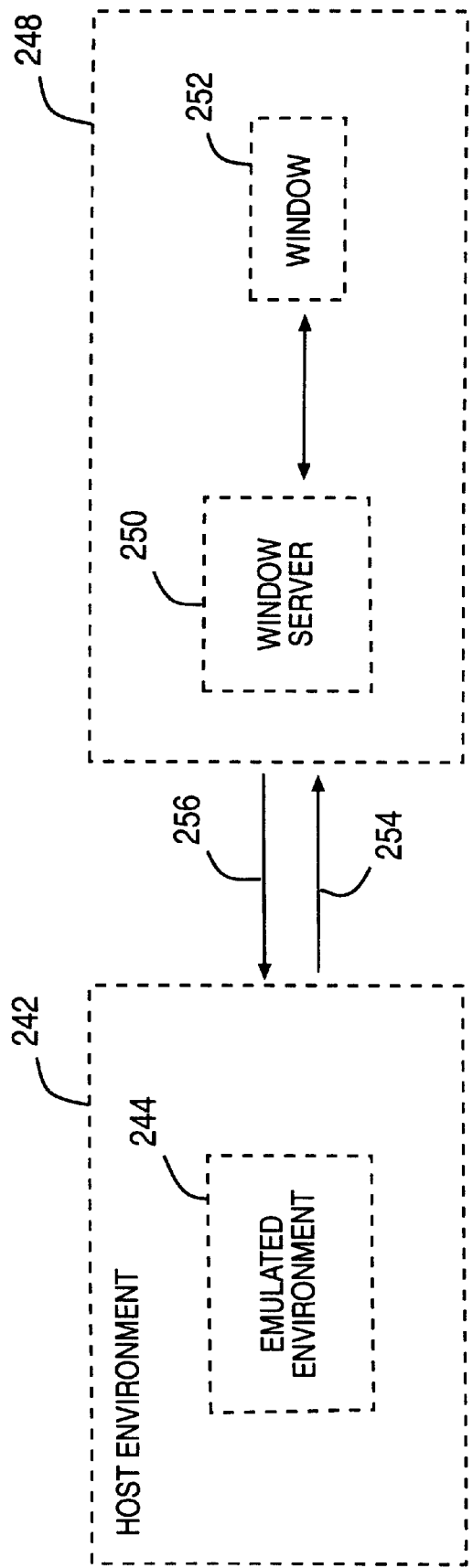
FIG. 2C provides an alternate embodiment including an emulated environment's window server executing on a second system.

Alternatively, the window server can be running on a system that executes the emulated environment's window server. FIG. 2C provides an alternate embodiment including an emulated environment's window server executing on a second system.

Host environment 242 includes emulated environment 244. Emulated environment 244 is capable of executing applications written for execution in emulated environment 244. Emulated environment 244 further includes a remote communication capability such as NeXT's Portable Distributed Objects. Native environment 248 is running the emulated environment in its native form. Native environment 248 includes window server 250, an unmodified version of the emulated environment's window server. Window server 250 displays output generated by processes running in emulated environment 244 in host environment 242 in the same manner as it would an application running in native environment 248.

Emulated environment 244 and window server 250 communicate via the IPC mechanism provided in native environment 248 and ported to host environment 242. Thus, for example, ports 254 and 256 are established between emulated environment 244 and window server 250.

Output generated by an application running in emulated environment 244 is transmitted to window server 250 using port 254. Window server 250 processes the output in native environment 248 and displays the output in window 252. Input associated with window 252 is processed by window server 250 and transmitted via port 256 to an application running in emulated environment 244.

Thus, a method and apparatus for executing an environment within the window of another environment has been described in conjunction with one or more specific embodiments. The invention is defined by the claims and their full scope of equivalents.

I claim:

1. A method of emulating an environment in a host environment comprising:

executing said environment in said host environment;

displaying graphic output generated by said environment; and translating a plurality of events of said host environment into a plurality of translated events of said environment.

2. The method of claim 1 wherein said translating is performed by an event driver, said method further comprising:

receiving by said event driver said plurality of events of said host environment; and transmitting said plurality of translated events to said environment.

3. The method of claim 2 wherein said transmitting further comprises:

storing said plurality of translated events in shared memory;

said event driver notifying a window server; and said window server forwarding said plurality of translated events to said environment.

4. The method of claim 3 wherein said storing further comprises:

determining whether said plurality of translated events can be combined with a previous translated event; and storing said plurality of translated events in said shared memory when said plurality of translated events cannot be combined with said previous translated event.

5. The method of claim 1 wherein said displaying further comprises:

receiving by a window server said graphic output; and said window server generating said graphic output.

6. The method of claim 5 wherein said window server is executing in said host environment, said generating further comprises:

mapping said graphic output to a window of said host environment.

7. The method of claim 5 wherein said window server is executing in a computer system configured to run said environment as its native environment, said displaying further comprises:

said environment transmitting said output to said computer system; and said window server mapping said graphic output to the screen of said native environment.

8. An article of manufacture comprising:
a computer usable medium having computer readable program code embodied therein for emulating an environment in a host environment, the computer readable program code in said article of manufacture comprising;
computer readable program code configured to cause a computer to execute said environment in said host environment;
computer readable program code configured to cause a computer to display graphic output generated by said environment; and
computer readable program code configured to translate a plurality of events of said host environment into a plurality of translated events of said environment.

9. The article of manufacture of claim 8, further comprising:
computer readable program code configured to cause a computer to receive by an event driver said plurality of events of said host environment; and
computer readable program code configured to cause a computer to transmit said plurality of translated events to said environment.

10. The article of manufacture of claim 9 wherein said program code configured to cause said computer to transmit further comprises:
computer readable program code configured to cause a computer to store said plurality of translated events in shared memory;
computer readable program code configured to cause a computer to notify a window server; and
computer readable program code configured to cause a computer to forward said plurality of translated events to said environment.

11. The article of manufacture of claim 10 wherein said program code configured to cause said computer to store said plurality of translated events further comprises:
computer readable program code configured to cause a computer to determine whether said plurality of translated events can be combined with a previous translated event; and
computer readable program code configured to cause a computer to store said plurality of translated events in said shared memory when said plurality of translated events cannot be combined with said previous translated event.

12. The article of manufacture of claim 8 wherein said program code configured to cause said computer to display further comprises:
computer readable program code configured to cause a computer to receive by a window server said graphic output; and
computer readable program code configured to cause a computer to generate said graphic output.

13. The article of manufacture of claim 12 wherein said window server is executing in said host environment, said program code configured to cause said computer to generate further comprises:
computer readable program code configured to cause a computer to map said graphic output to a window of said host environment.

14. The article of manufacture of claim 12 wherein said window server is executing in a computer system configured to run said environment as its native environment, said program code configured to cause said computer display further comprises:

computer readable program code configured to cause a computer to transmit said output to said computer system; and
computer readable program code configured to cause a computer to map said graphic output to the screen of said native environment.

15. An apparatus comprising:
a central processing unit (CPU), said CPU configured to execute an environment and a host environment;
a window server coupled to said environment and said host environment configured to display graphic output of said environment.

16. The apparatus of claim 15 further comprising:
an event driver coupled to said environment and said window server configured to process input associated with said environment.

17. The apparatus of claim 16 further comprising:
memory coupled to said event driver and said window server.

18. The apparatus of claim 16 further comprising:
a communication path coupled to said event driver and said window server.

19. The apparatus of claim 15 wherein said window server is executing in said host environment.

20. The apparatus of claim 15 wherein said window server is executing on a second central processing unit running said environment as its native environment.

21. A method of emulating an environment in a host environment comprising:
executing an emulated environment in a host environment;
translating, in an event driver, an event of said host environment to an event of said emulated environment; and
mapping, in a window server, graphic output of said emulated environment to a window of said host environment.

22. The method of claim 21, further comprising:
said event driver storing a plurality of translated events in shared memory;
said event driver notifying said window server of said stored events; and
said window server forwarding said stored events to at least one application running within said emulated environment.

23. The method of claim 22, wherein said storing of said plurality of translated events comprises determining whether said plurality of translated events can be combined with a previous translated event.

24. An article of manufacture comprising:
a computer usable medium having computer readable program code embodied therein for emulating an environment in a host environment, the computer readable program code in said article of manufacture comprising:
computer readable program code configured to cause a computer to execute an emulated environment in a host environment;
computer readable program code configured to cause a computer to translate, in an event driver, an event of said host environment to an event of said emulated environment; and
computer readable program code configured to cause a computer to map, in a window server, graphic output of said emulated environment to a window of said host environment.

25. The article of manufacture of claim 24, further comprising:
   computer readable program code configured to cause said event driver to store a plurality of translated events in shared memory;
   computer readable program code configured to cause said event driver to notify said window server of said stored events; and
   computer readable program code configured to cause said window server to forward said stored events to at least one application running within said emulated environment.

26. The article of manufacture of claim 25, wherein said computer readable program code configured to cause said event driver to store said plurality of translated events comprises:
   computer readable program code configured to cause a computer to determining whether said plurality of translated events can be combined with a previous translated event.

27. An apparatus comprising:
   a central processing unit configured to execute an emulated environment in a host environment;
   an event driver for translating events between said host environment and said emulated environment; and
   a window server for mapping graphic output of said emulated environment to a window of said host environment.

28. The apparatus of claim 27, wherein said window server is configured to process input associated with said emulated environment.

29. The apparatus of claim 27, further comprising shared memory coupled to said event driver and said window server.

30. The apparatus of claim 29, wherein said shared memory is used for the transfer of translated events between said event driver and said window server.

31. The apparatus of claim 27, further comprising a communication path coupled to said event driver and said window server.

32. The apparatus of claim 27, further comprising an application executing within said emulated environment, wherein said window server is configured to forward translated events to said application.

33. The apparatus of claim 27, further comprising a plurality of applications executing within said emulated environment, wherein said window server is configured to forward translated events to said plurality of applications.

34. The apparatus of claim 27, wherein said window server is executing in said host environment.

35. The apparatus of claim 27, further comprising a second central processing unit executing said emulated environment as a native environment, wherein said window server is executing within said native environment.

36. A method of emulating an environment in a host environment comprising:
   executing said environment in said host environment;
   displaying graphic output generated by said environment, said displaying comprising:
      receiving by a window server said graphic output; and
      said window server generating said graphic output.

37. The method of claim 36 wherein said window server is executing in said host environment, said generating comprising:
   mapping said graphic output to a window of said host environment.

38. The method of claim 36 wherein said window server is executing in a computer system configured to run said environment as its native environment, said displaying further comprising:
   said environment transmitting said output to said computer system; and
   said window server mapping said graphic output to the screen of said native environment.

39. An article of manufacture comprising:
   a computer usable medium having computer readable program code embodied therein for emulating an environment in a host environment, the computer readable program code in said article of manufacture comprising;
   computer readable program code configured to cause a computer to execute said environment in said host environment; and
   computer readable program code configured to cause a computer to display graphic output generated by said environment, comprising:
      computer readable program code configured to cause a computer to receive by a window server said graphic output; and
      computer readable program code configured to cause a computer to generate said graphic output.

40. The article of manufacture of claim 39 wherein said window server is executing in said host environment, said program code configured to cause said computer to generate further comprises:
   computer readable program code configured to cause a computer to map said graphic output to a window of said host environment.

41. The article of manufacture of claim 39 wherein said window server is executing in a computer system configured to run said environment as its native environment, said program code configured to cause said computer display further comprises:
   computer readable program code configured to cause a computer to transmit said output to said computer system; and
   computer readable program code configured to cause a computer to map said graphic output to the screen of said native environment.

* * * * *